US011361008B2

(12) United States Patent
Griffith et al.

(10) Patent No.: US 11,361,008 B2
(45) Date of Patent: *Jun. 14, 2022

(54) COMPLEX QUERY HANDLING

(71) Applicant: INTERNATIONAL BUSINESS MACHINES CORPORATION, Armonk, NY (US)

(72) Inventors: Timothy P. Griffith, Southampton (GB); Ian M. Shore, Winchester (GB); Samuel J. Smith, Winchester (GB); Martin J. Smithson, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 834 days.

This patent is subject to a terminal disclaimer.

(21) Appl. No.: 15/815,294

(22) Filed: Nov. 16, 2017

(65) Prior Publication Data

US 2018/0075040 A1 Mar. 15, 2018

Related U.S. Application Data

(63) Continuation of application No. 14/982,918, filed on Dec. 29, 2015, now Pat. No. 9,892,191, which is a (Continued)

(30) Foreign Application Priority Data

May 11, 2010 (EP) ..................................... 10162495

(51) Int. Cl.
*G06F 16/332* (2019.01)
*G06F 16/338* (2019.01)

(52) U.S. Cl.
CPC ........ *G06F 16/3322* (2019.01); *G06F 16/338* (2019.01)

(58) Field of Classification Search
CPC ........... G06F 16/2423; G06F 16/90324; G06F 16/338; G06F 16/3322
See application file for complete search history.

(56) References Cited

U.S. PATENT DOCUMENTS 6,510,436 B1 1/2003 Hart
6,564,213 B1 5/2003 Ortega
(Continued)

OTHER PUBLICATIONS

IP.com, Prior Art Database; Context sensitive autocomplete, Authors et al.: IBM, IP.com No. IPCOM000188356D Original Publication Date: Oct. 1, 2009, IP.com Electronic Publication: Oct. 1, 2009; pp. 1-3.
(Continued)

*Primary Examiner* — Marc S Somers
(74) *Attorney, Agent, or Firm* — Fabian VanCott; Steven L. Nichols

(57) ABSTRACT

Processing a query for a database includes: receiving a portion of a query from a client device in a server implemented by at least one processor, the portion of the query comprising an incomplete component; determining that the incomplete component is one of multiple predefined types with the server; providing the incomplete component to an auto-complete function specific to the determined type of the incomplete component; receiving in the server a suggestion for completing the query from the auto-complete function, the suggestion being specific to the type of the incomplete component; and providing the suggestion from the server to the client device.

20 Claims, 6 Drawing Sheets

Related U.S. Application Data continuation of application No. 13/104,699, filed on May 10, 2011, now Pat. No. 9,323,828.

(56) References Cited

U.S. PATENT DOCUMENTS

| | | | |
|---|---|---|---|
| 7,603,349 B1 | 10/2009 | Kraft et al. | |
| 2004/0249796 A1 | 12/2004 | Azzam | |
| 2004/0254928 A1 | 12/2004 | Vronay | |
| 2006/0101324 A1* | 5/2006 | Goldberg | G06F 17/245 715/227 |
| 2006/0167856 A1* | 7/2006 | Angele | G06F 16/2471 |
| 2007/0050352 A1 | 3/2007 | Kim | |
| 2007/0208738 A1 | 9/2007 | Morgan | |
| 2008/0270343 A1* | 10/2008 | Brodsky | G06F 16/2423 |
| 2009/0006543 A1 | 1/2009 | Smit | |
| 2009/0070326 A1 | 3/2009 | Kraft | |
| 2009/0112848 A1 | 4/2009 | Kunjithapatham et al. | |
| 2009/0132950 A1* | 5/2009 | Gibson | G06F 17/2725 715/780 |
| 2009/0187515 A1* | 7/2009 | Andrew | G06F 16/9535 706/12 |
| 2010/0106729 A1* | 4/2010 | Pan | G06F 16/951 707/747 |
| 2010/0275109 A1 | 10/2010 | Morrill | |
| 2012/0197864 A1 | 8/2012 | Bourdoncle | |

OTHER PUBLICATIONS

IP.com, Prior Art Database; A method to detect and adapt to typing errors and near matches during interactive search with autosuggestions or search results, Authors et al.: IBM, IP.com No. IPCOM000189278D Original Publication Date: Nov. 3, 2009, IP.com Electronic Publication: Nov. 3, 2009; pates 1-8.

List of IBM Patents or Patent Applications Treated as Related; Jun. 27, 2019; pp. 1-2.

* cited by examiner

COMPLEX QUERY HANDLING

BACKGROUND

Aspects of the present invention relate to handling received queries. In particular, the present invention relates to providing an auto-suggest function for complex query construction.

The expansion of modern computing and information storage and retrieval has created an environment where a large amount of information is easily accessible by users who have access to a suitably connected computer. The Internet provides a huge amount of information, much of it in an unstructured form, and more organized information storage systems such as databases still store huge amounts of data that can be very difficult for a user to navigate. The expansion in information availability via the Internet and databases (which can be accessed locally or via connections such as the Internet) has created the technical field of information searching.

There are two different levels of search task that a user might conduct through a user interface provided by a computer. The most common is a keyword search, popular examples of which are provided by web search engines such as Google. This form of searching is generally very well supported and has been significantly enriched with features such as "auto-suggest" (also known as type-ahead and auto-complete), which allows for a very quick, slick searching experience with excellent results for the end user, and a widespread take-up of the services by the general computing population.

The second level of searching is only used by a much more technically advanced computer user population, and consists of more advanced "queries", which include multiple terms, complex syntax and consider relationships as well as attributes. Examples of these include WSRR (WebSphere® Service Registry and Repository) query creation wizard, RTC (RealThinClient) query builder, Google advanced search and specific languages such as Xpath (designed for the purpose of querying XML documents). However these complex query systems do not receive the same level of support that exists for keyword searching, rather the queries are assembled either with no help or with some guidance over the model only and then finally submitted to the associated database.

BRIEF SUMMARY

A method of processing a query for a database includes: receiving a portion of a query from a client device in a server implemented by at least one processor, the portion of the query including an incomplete component; determining that the incomplete component is one of multiple predefined types with the server; providing the incomplete component to an auto-complete function specific to the determined type of the incomplete component; receiving in the server a suggestion for completing the query from the auto-complete function, the suggestion being specific to the type of the incomplete component; and providing the suggestion from the server to the client device A server for processing a query for a database includes a processor communicatively coupled to a memory. The memory stores executable code which, when executed by the processor, causes the processor to: receive a portion of a query from a client device in a server implemented by at least one processor, the portion of the query including an incomplete component; determine that the incomplete component is one of a plurality of predefined types with the server; invoke an auto-complete function specific to the determined type of the incomplete component to obtain a suggestion for completing the query, the suggestion being specific to the type of the incomplete component; and initiate transmission of the suggestion from the server to the client device.

A method of processing a query for a database includes: receiving in a computing device implemented by at least one processor an incomplete component of a query and a classification of the incomplete component as one of: a model type, a structural type, and a data type; generating a suggestion for completing the incomplete component based on the type of the incomplete component, the suggestion being specific to the type of the incomplete component.

A computer program product for processing a query of a database includes a tangible computer-readable storage medium having computer-readable program code embodied therewith. The computer-readable program code includes: computer-readable program code configured to receive a portion of a query from a client device in a server implemented by at least one processor, the portion of the query including an incomplete component; computer-readable program code configured to determine that the incomplete component is one of a plurality of predefined types with the server; computer-readable program code configured to invoke an auto-complete function specific to the determined type of the incomplete component to obtain a suggestion for completing the query, the suggestion being specific to the type of the incomplete component; and computer-readable program code configured initiate transmission of the suggestion from the server to the client device.

A computer program product for processing a query of a database includes a tangible computer-readable storage medium having computer-readable program code embodied therewith. The computer-readable program code includes: computer-readable program code that receives an incomplete component of a query and a classification of the incomplete component as one of: a model type, a structural type, and a data type; and computer-readable program code that generates a suggestion for completing the incomplete component based on the type of the incomplete component, the suggestion being specific to the type of the incomplete component.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

DETAILED DESCRIPTION

Figure 1:
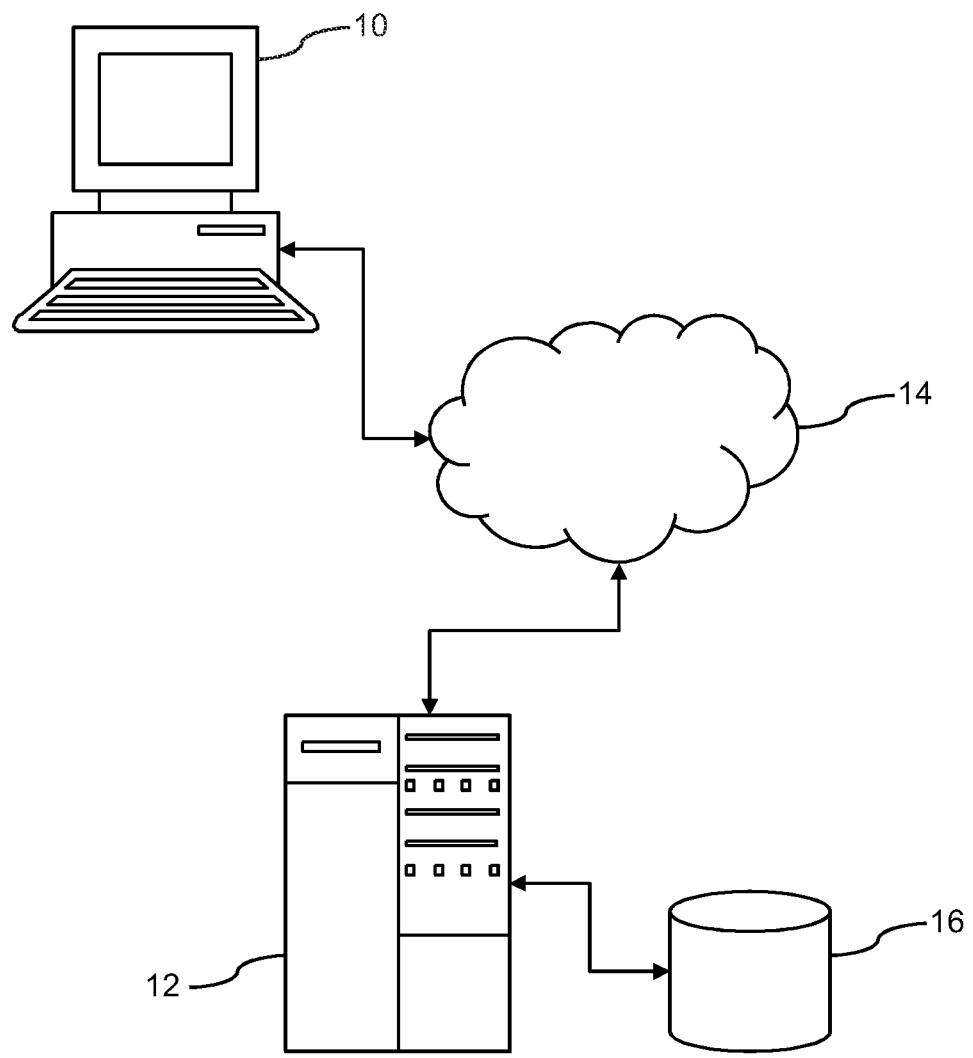
FIG. 1 is a schematic diagram of an illustrative client-server arrangement, according to one example of the principles described herein.

The present specification discloses systems, methods, and computer program products for handling queries. In particular, the systems, methods, and computer program products disclosed in the present specification may provide an auto-suggest function for complex query construction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the Figures, an example of a client-server system is shown in FIG. 1. A client device 10, such as a conventional computer or mainframe terminal, connects to a server 12 via a network 14. The network 14 may be a local network, or a wide area network such as the Internet. The client device 10 may connect to the server using conventional communication protocols such as TCP/IP or any other appropriate communication arrangement. The server 12 is connected to a database 16. In FIG. 1, the database 16 is shown as a separate physical entity to the server 12, but may equally be provided by the hardware of the server 12, in which case the database 16 would exist as a logical entity within the server 12.

A user can access the functionality of the database 16 via the server 12. The database 16 may be, for example, part of a web service registry and repository, such as an IBM WebSphere® Service Registry and Repository (WSRR). IBM and WebSphereg® are a registered trade mark of IBM. WSRR is a system for storing, accessing and managing information, commonly referred to as service metadata, used in the selection, invocation, management, governance and reuse of services in a service oriented architecture. Under the WSRR standard, the database 16 is a location where there is stored information about services throughout the system, or in other organizations' systems. The services may be services that are already used, or plan to be used, or of which users want to be aware.

A user may access information stored within the database 16 by framing queries using WSRR's query language. The client device 10 and server 12 support an auto-suggest capability for complex query construction. The principals of the design of the client device 10 and server 12 are applicable for any query language which has a backing model, such as Structured Query Language (SQL) for Java Database Connectivity (JDBC) and SPARQL for the WSRR Persistence Layer. The example described here with respect to the Figures is specific to WSRR and refers to the application of the design pattern to WSRR's Xpath-like language and using the code facilities available within WSRR. When a user frames a query at the client device 10, the client 10 and server 12 interact to provide an auto-suggest function.

Figure 2:
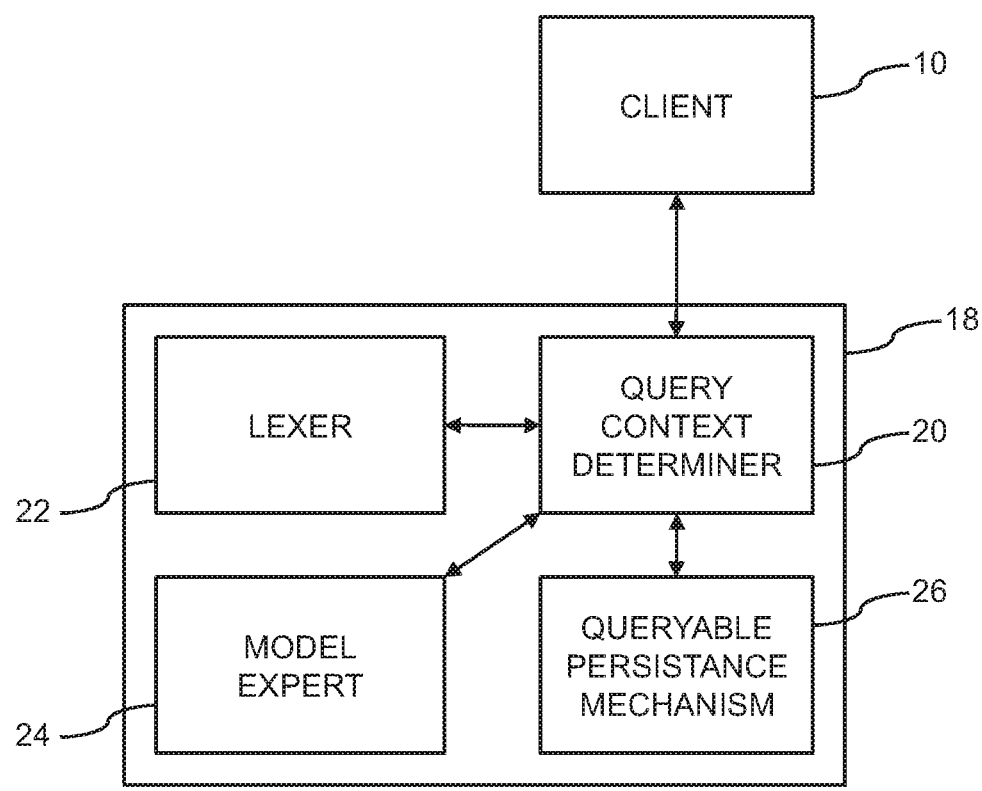
FIG. 2 is a schematic diagram of an illustrative auto-suggest service, according to one example of the principles described herein.

FIG. 2 illustrates an auto-suggest service 18, which is implemented by the server 12 of FIG. 1. The service 18 may be a dedicated hardware component or circuitry. Alternatively, the service 18 may be provided by a computer program stored on a suitable computer readable medium. The client 10 may be connected to this service 18 when the client 10 frames a query for running against the content of the database 16. The connection to the service 18 may occur either automatically or on-demand from the user. Once the user starts typing a query at the client device 10, if there are a sufficient amount of characters present since the last "action token" and a suitable "pause" has occurred then the server 12 will submit the existing query string to the server helper function 18 together with the current location of the cursor within the string.

The server 12 receives the received query string at the context determiner 20 and passes it through an appropriate query language lexer (i.e., lexical analyzer) 22 to parse the query to get an internal representation. The query context determiner 20 determines if the context of the query component the user is looking to complete is either a data model component, a query language feature/operation, or a data value. In response, the query component is passed to the relevant auto-complete function within the service 18, according to the determined context and various completion candidates are generated. The auto-complete function provided by the service 18 is dependent on the determined context of the user's query.

For a model component, the model representation stored within the model expert 24 is queried for applicable elements that match the existing representation, using the existing context from the lexer 22, i.e. already scoped to a given class (Xpath), table (SQL), or graph (SPARQL). For a structural component, the lexer 22 knows the list of permissible symbols it expects for the next step, as dictated by the language grammar. For a data component, a keyword auto-suggest query can be run, but within the context of the existing query structure, thereby giving results only in the currently specified scope. This is carried out by the queryable persistence mechanism 26, which builds a query with a matches constraint and a return value of the string(s) matched.

The suggestions are passed back to the client 10, together with the current validity of the query, thereby indicating whether the query is syntactically valid to run "as is" at the current point in time. The client 10 renders the suggestions, and can illustrate whether, with the suggestion added in, the new query can run or not, using validity highlighting. In summary therefore, the user will begin typing a query which will be used as the basis to perform an auto-complete function on the current query. In general, the auto-complete function will only be triggered when it is perceived that the user is struggling to complete the query, for example after a pre-determined time-delay since the last keystroke.

Figure 3:
FIG. 3 is a schematic diagram of an illustrative display device with a graphical user interface, according to one example of the principles described herein.

FIG. 3 shows an example of a user interface that will be presented to the user at their client device 10. The user will be running a local application on their client computer 10 that is connecting to the server 12 and therefore to the database 16, so that the user can access the WSRR functionality provided by the database 16. As discussed above, the user can opt in or out of the auto-complete function, and once the function is turned on, the user can specifically request that auto-complete be performed, or the function will be triggered automatically, as discussed above. The auto-complete will run on whatever the user has entered so far.

In FIG. 3, a display device 28 is showing an application window 30, which is a graphical user interface to the WSRR function provided by the database 16. The user can enter a query through a keyboard of the client device 10 and use the enter key to send that query to the server 12 to be applied to the database 16. In this case, the user has started to enter the expression /WSRR/GenericObject[@property="fo into the search interface of the window 30. The user has stalled at this point, and therefore the auto-complete function will be triggered once the user has passed a predetermined time period (for example, five seconds) without entering a further keystroke.

In this embodiment, the client-server system provides an Xpath auto-suggest/auto-complete/type ahead for the WSRR database 16. Within the auto-suggest service 18, the lexer 22 is an Xpath tokenizer/parser/lexer. The model expert 24 is the system "business model manager" which keeps a record of all class types, attributes and their datatypes and associations between classes. The query context determiner 20 for this embodiment goes beyond determining that the suggest action required is a model one, but from the query syntax can determine whether the desired suggestion is for a class, attribute or relationship and can scope based on other model tokens that have occurred en-route to this token in the lexical graph.

The queryable persistence mechanism 26 in this case is the WSRR persistence manager and all data value type suggestions are submitted as queries with a "matches" condition for the value built into the, otherwise as-tokenized, query graph. In the example of the query entered in FIG. 3, the user has typed the expression /WSRR/GenericObject [@property="fo into the graphical user interface 30 and the service 18 will perform an auto-complete function taken from this point in the query creation, on the basis that the auto-completion has been triggered by the user pausing in their keystroke process. The various components of the service 18 will now be activated to perform the auto-completion of the complex query.

Figure 4:
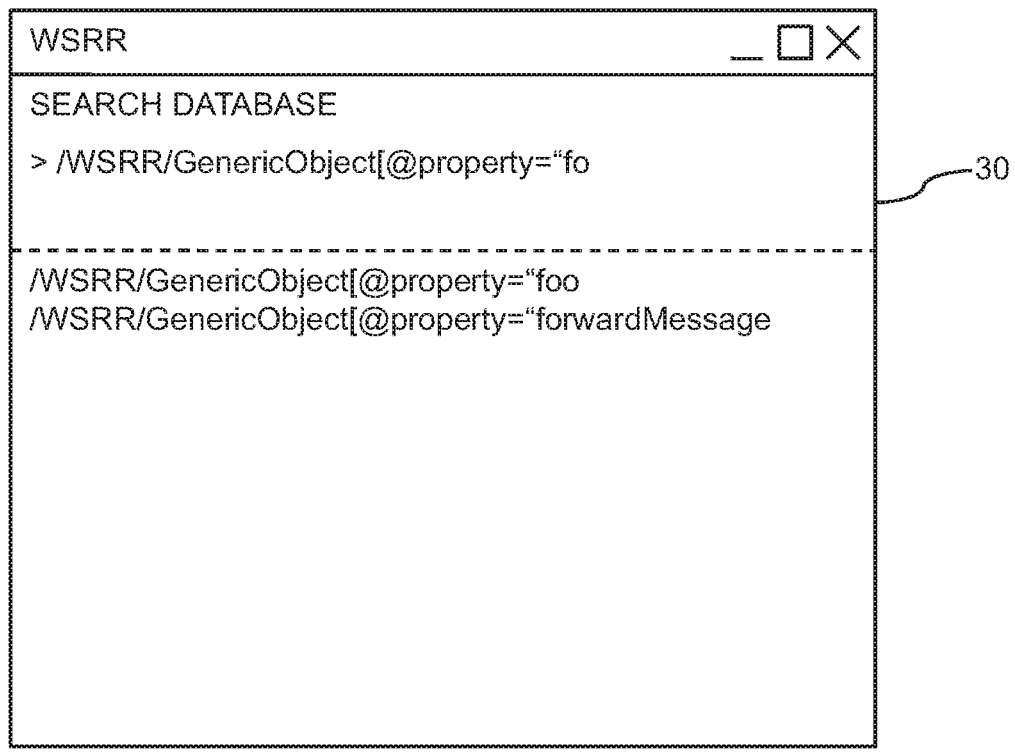
FIGS. 4 and 5 are further schematic diagrams of an illustrative graphical user interface, according to examples of the principles described herein.

The service 18 completes the query by closing all open filters and replacing the property being sought with a matches condition. So the above partial query typed in by the user will be converted into the query /WSRR/GenericObject[matches(@property, 'fo %')], which is a valid query that can be applied to the database 16. The property to be returned from the query is @property, thereby giving the list of possible property values which satisfy the query as above. FIG. 4 illustrates the end result of the auto-completion process as presented to the user in the window 30. In the lower part of the window 30 suggestions are provided to the user that can be selected, for example by clicking the cursor on the desired completion.

A number of enhancements are possible for the auto-completion system. For example, when there are a lot of candidates returned by the model expert 24 for a given situation, i.e. the set of all classes, data can be wrapped into a hierarchy for the user to explore in the auto-suggest, rather than a linear list. This expansion could be done in several different ways. For example, the service 18 could be configured to send all of the data to the client 10, or send "root elements" to the client 10 and do follow-up requests when asked to expand a given node in the hierarchy, or perform a hybrid of the two methods and send up front nodes to a certain "depth" in the hierarchy and then satisfy on-demand or in further depth batches beyond.

Figure 5:
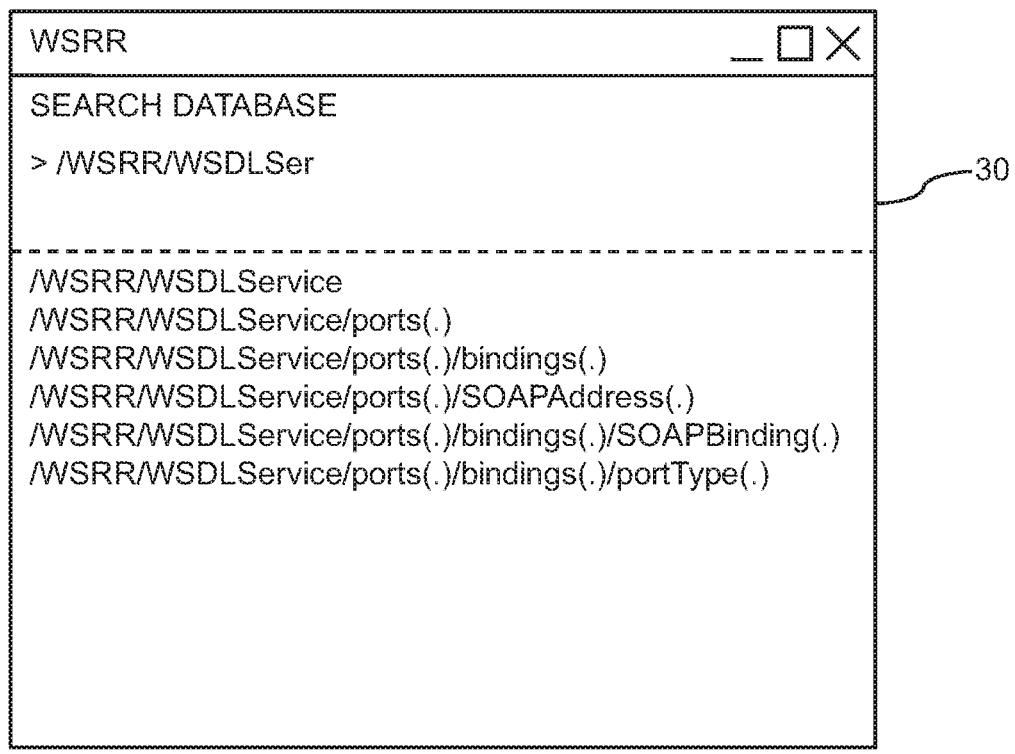

FIG. 5 gives an example of a hierarchical approach which can be used within the auto-suggest function provided by the server 12. In this case, the user has typed "/WSRR/WSDLSer", and has then triggered the auto-suggest (whether through a direct user action or through a detected delay in the user's typing). The auto-suggest provides a number of different candidates for the auto-completion, which reflect a hierarchy of possible query constructions, as shown in the lower half of the window 30. The user can make a selection from the list provided and can then either access further auto-completion candidates from that point in the hierarchy, or can continue extending the query from the candidate selected.

For the lexer 22, when being used to identify a structural component, rather than simply returning the list of permissible tokens according to the grammar, instead these can be categorized to more general concepts (together with the actual backing character) so that the user does not have to interact with the language syntax directly, but rather can deal with more general and familiar functions. Effectively a natural language is used instead of or in addition to the returned symbols, so that the user can identify the function of the proposed candidates by their natural language definitions. So if the service 18 determines that the auto-completion context of the query is the requirement for a structural component, natural language can be used to identify the returned candidates.

The results for the model component and the structural component can have their ordering determined by selection frequency. For the presentation of the final results to the client device 10, if there are a small enough number of permutations, and for each permutation where the query ends up as "complete" it can be run as a "count query" to give an indication (with ordering) by the number of results the query would so-far match on the database 16. The position of the cursor on the query allows the user to go back and re-complete already existing functions meaning that unlike most traditional left-to-right last character auto-completion systems the user can sensibly re-complete individual tokens without losing all work to the right of the cursor.

Figure 6:
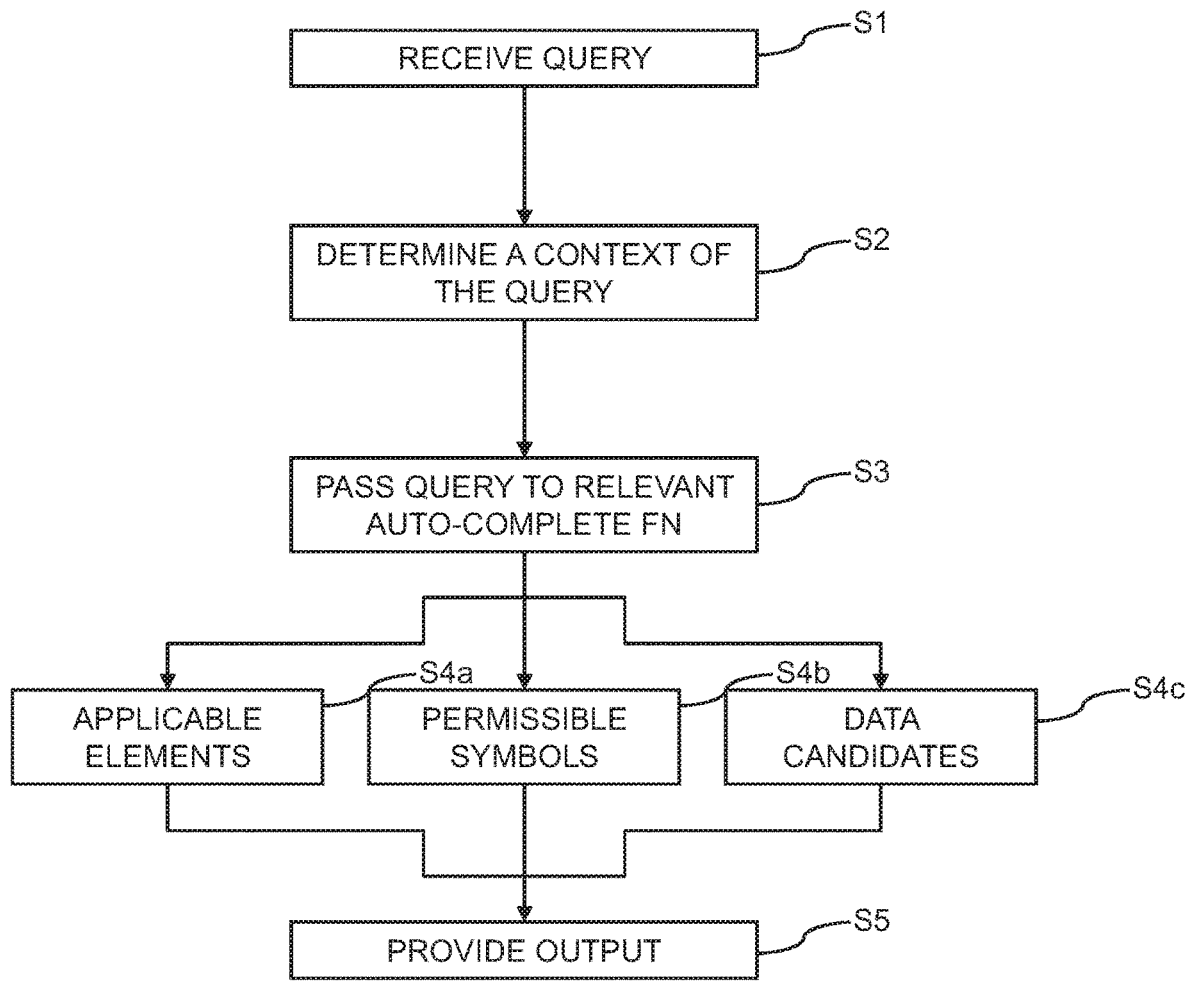
FIG. 6 is a flowchart of an illustrative method of handling a query, according to one example of the principles described herein.

A flowchart summarizing the methodology behind the auto-completion process carried out by the server 12 is shown in FIG. 6. The method of handling the query for the database 16 comprises, at block S1, receiving the query at the server 12. As discussed above, the client device 10 will transmit the query to the server 12 under well-defined circumstances, such as the user taking a specific pause in the keystrokes used to create the query. The second action, block S2, comprises determining a context of the query, the context comprising model, structural or data component. The auto-completion service 18 will determine the context of the query as it is currently received by the server 12.

Block S3 of the process includes passing the query to the relevant auto-complete function within the service 18, according to the determined context. The auto-completion service 18 of the server 12 will handle the query according to the determined context of block S2. Therefore, at block S4a, if the determined context comprises a model component, then there is accessed a model representation for applicable elements. At block S4b, if the determined context comprises a structural component, then there is determined a list of permissible symbols. At block S4c, if the determined context comprises a data component, then there is performed an auto-suggest operation on the database 16 to return data candidates.

Block S5 includes providing an output of the applicable elements, permissible symbols or data candidates, as appropriate. The server 12 will return an output to the client device 10 for the user. The output will comprise one or more possible completions of the query received from the client device 10 that the user is currently entering. These possible completions may also include an indication as to whether the query is valid as it currently stands or whether the user is required to extend further the query results. For example, if the user is struggling for structural component, then the provision of an appropriate symbol via the auto-completion will not necessarily complete a valid query.

In using the client-server system described above for auto-completion of complex queries, the context of the query is determined, not only by what the client types and the syntax of the query language but also by the contents of the database 16. So, for example, when the client types "/WSRR/WSDLDocument[classif" the server can auto-suggest: "/WSRR/WSDLDocument[classifiedByAnyOf(.,'" or "/WSRR/WSDLDocument[classifiedByAllOf(.,'"

Extending this example further, the server 12 knows that the context now is with classification systems and will auto-suggest classification URIs. Additionally, with respect to database data, when the client types "//*[@name='ad", the server 12 can query the database and auto-suggest "//*[@name='address".

The Xpath used in WSRR is used to query on document types and the metadata attached to those documents and provided Xpath functions (such as classifiedByAnyOf above). So, for example, if a user loaded a WSDL document into WSRR the additional metadata that can be provided are name, namespace, version, description, etc. and any classifications such as categorizations or classes to aid its description and any relationships to other data loaded into WSRR. So, the WSRR Xpath grammar would aid type-ahead based on the Xpath keywords typed and the metadata values already associated with particular types, for example by looking at the names of WSDL documents loaded in WSRR, typing "ad", the type-ahead would suggest address if there was a WSDL document named "address".

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
    receiving a portion of a database query from a client device in a server implemented by at least one processor, the portion of the database query comprising an incomplete component;
    determining, from the incomplete component, that the incomplete component is one of a plurality of predefined types with the server, the predefined types comprising a data model component, a query language feature, or a data value;
    providing the incomplete component to an auto-complete function specific to the determined type of the incomplete component;
    receiving in the server a number of suggestions for completing the database query from the auto-complete function, the suggestion being specific to the type of the incomplete component; and
    providing the number of suggestions from the server to the client device.

2. The method of claim 1, wherein the database is a repository of web services.

3. The method of claim 1, wherein determining, from the incomplete component, that the incomplete component is one of a plurality of predefined times occurs as the incomplete component is input.

4. The method of claim 1, further comprising determining whether a completed database query with a suggestion added in is syntactically valid to run as is.

5. The method of claim 1, wherein providing the number of suggestions from the server to the client device comprises providing the number of suggestions as a hierarchy.

6. The method of claim 1, wherein providing the number of suggestions from the server to the client device comprises providing the number of suggestions in an order based on selection frequency.

7. The method of claim 1, wherein providing the number of suggestions from the server to the client device comprises providing an indication of a quantity of results a completed database query with a suggestion added in would match on the database.

8. A server comprising:
    a processor communicatively coupled to a memory, the memory storing executable code which, when executed by the processor, causes the processor to:
        receive a portion of a database query from a client device in a server implemented by at least one processor, the portion of the database query comprising an incomplete component;
        determine from the incomplete component that the incomplete component is one of a plurality of predefined types with the server, the predefined types comprising a data model component, a query language feature, or a data value;
        invoke an auto-complete function specific to the determined type of the incomplete component to obtain a suggestion for completing the database query, the suggestion being specific to the type of the incomplete component; and
        initiate transmission of the suggestion from the server to the client device.

9. The system of claim 8, wherein:
    the database comprises information about services of the system; and
    the database query is a query for service metadata used in the management of the services in a service oriented architecture.

10. The system of claim 8, further comprising a query context determiner to determine a context of a query component a user is looking to complete.

11. The system of claim 10, further comprising a model expert which is queried for applicable elements based on a class, table, and graph of the existing context.

12. The system of claim 11, wherein the model expert comprises a records of class types, attributes, data-types and associations between classes.

13. The system of claim 12, wherein the query context determiner determines whether a suggestion is to be a suggestion for a class, attribute, or association.

14. A computer program product for processing a database query, comprising:
    a non-transitory computer-readable storage medium comprising computer-readable program code embodied therewith, the computer-readable program code comprising:
        computer-readable program code to receive a portion of a database query from a client device in a server implemented by at least one processor, the portion of the database query comprising an incomplete component;
        computer-readable program code to determine from the incomplete component, the syntax of the query language, and metadata associated with the contents of the database that the context of the incomplete component is one of a plurality of predefined types with the server, the predefined types comprising a model type that comprises a model component, a structural component that comprises a query language feature, and a data component that comprises a data value;

computer-readable program code to, based on a determined context of the incomplete component, pass the incomplete component to a different auto-complete function that is dependent on the determined type of the incomplete component to obtain a number of suggestions for completing the database query, the suggestion being specific to the type of the incomplete component; and computer-readable program code to provide the number of suggestions from the server to the client device.

15. The computer program product of claim 14, wherein the database is a repository of web services.

16. The computer program product of claim 14, wherein the database query is framed using a query language specific to the database.

17. The computer program product of claim 14, wherein the computer-readable program code to provide the number of suggestions from the server to the client device comprises computer-readable program code to send just root elements of a hierarchy to the client device.

18. The computer program product of claim 17, wherein the computer-readable program code to provide number of suggestions from the server to the client device further comprises computer-readable program code to, based on user input, expand a node in the hierarchy.

19. The computer program product of claim 14, wherein the computer-readable program code to provide number of suggestions from the server to the client device comprises computer-readable program code to send a number of root elements and a number of nodes to a predetermined depth of the hierarchy.

20. The computer program product of claim 19, wherein the computer-readable program code to provide number of suggestions from the server to the client device further comprises computer-readable program code to, based on user input, expand one of the number of nodes in the hierarchy.

\* \* \* \* \*